United States Patent [19]

Ahamed et al.

[11] Patent Number: 5,715,371

[45] Date of Patent: Feb. 3, 1998

[54] PERSONAL COMPUTER-BASED INTELLIGENT NETWORKS

[75] Inventors: Syed Vickar Ahamed; Victor Berrnard Lawrence, both of Holmdel, N.J.

[73] Assignee: Lucent Technologies Inc., Murray Hill, N.J.

[21] Appl. No.: 656,539

[22] Filed: May 31, 1996

[51] Int. Cl.$^6$ .................................................. G06F 15/00
[52] U.S. Cl. .................................. 395/11; 395/10; 395/20
[58] Field of Search .............................. 371/20; 379/207; 395/75, 50, 61, 11, 12, 10, 20; 364/513

[56] References Cited

U.S. PATENT DOCUMENTS

| | | | |
|---|---|---|---|
| 4,868,763 | 9/1989 | Masui et al. | 395/11 |
| 4,881,230 | 11/1989 | Clark et al. | 371/20.1 |
| 4,920,499 | 4/1990 | Skeirik | 395/12 |
| 5,208,898 | 5/1993 | Funabashi et al. | 395/50 |
| 5,227,835 | 7/1993 | Anagnostopoulos | 396/49 |
| 5,257,185 | 10/1993 | Farley et al. | 395/611 |
| 5,282,265 | 1/1994 | Rohra Suda et al. | 395/12 |
| 5,307,446 | 4/1994 | Araki et al. | 395/77 |
| 5,386,498 | 1/1995 | Kakefuda | 395/75 |
| 5,418,943 | 5/1995 | Borgida et al. | 395/604 |
| 5,465,319 | 11/1995 | Ahamed | 395/11 |
| 5,572,583 | 11/1996 | Wheeler, Jr. et al. | 379/207 |

OTHER PUBLICATIONS

Yagi et al. "AI–Assisted Telecommnications User Support System for Intelligent Network, " Globecom '91: IEEE Global Telecom. Conf., Dec. 30, 1991.

Moody. "AT & T PersonalLink (SM) —A public network for smart agent PICs, " IEE Colloq. Dec. 30, 1995.

Primary Examiner—Tariq R. Hafiz
Assistant Examiner—Ji-Yong D. Chung

[57] ABSTRACT

A knowledge processing system and method provides a personal computer-based intelligent network to incorporate personal functions with knowledge domain functions and database management functions. The knowledge processing system includes: a memory for storing knowledge in a plurality of knowledge modules in a knowledge bank, in which the knowledge includes data associated with pre-existing solutions to previous problems; and a processing unit, operating knowledge-based software configured to represent a specific user, for generating a plurality of artificial intelligence based modules, and for executing the plurality of artificial intelligence base modules to process input data, including problem related data, for generating a solution-related module from the data representing the pre-existing solutions, with the solution-related module corresponding to a solution to the current problem. Personalized intelligent networks (PINs) are implemented by a personal computer, and are customized to the personality of the user and to achieve personalized goals.

11 Claims, 6 Drawing Sheets

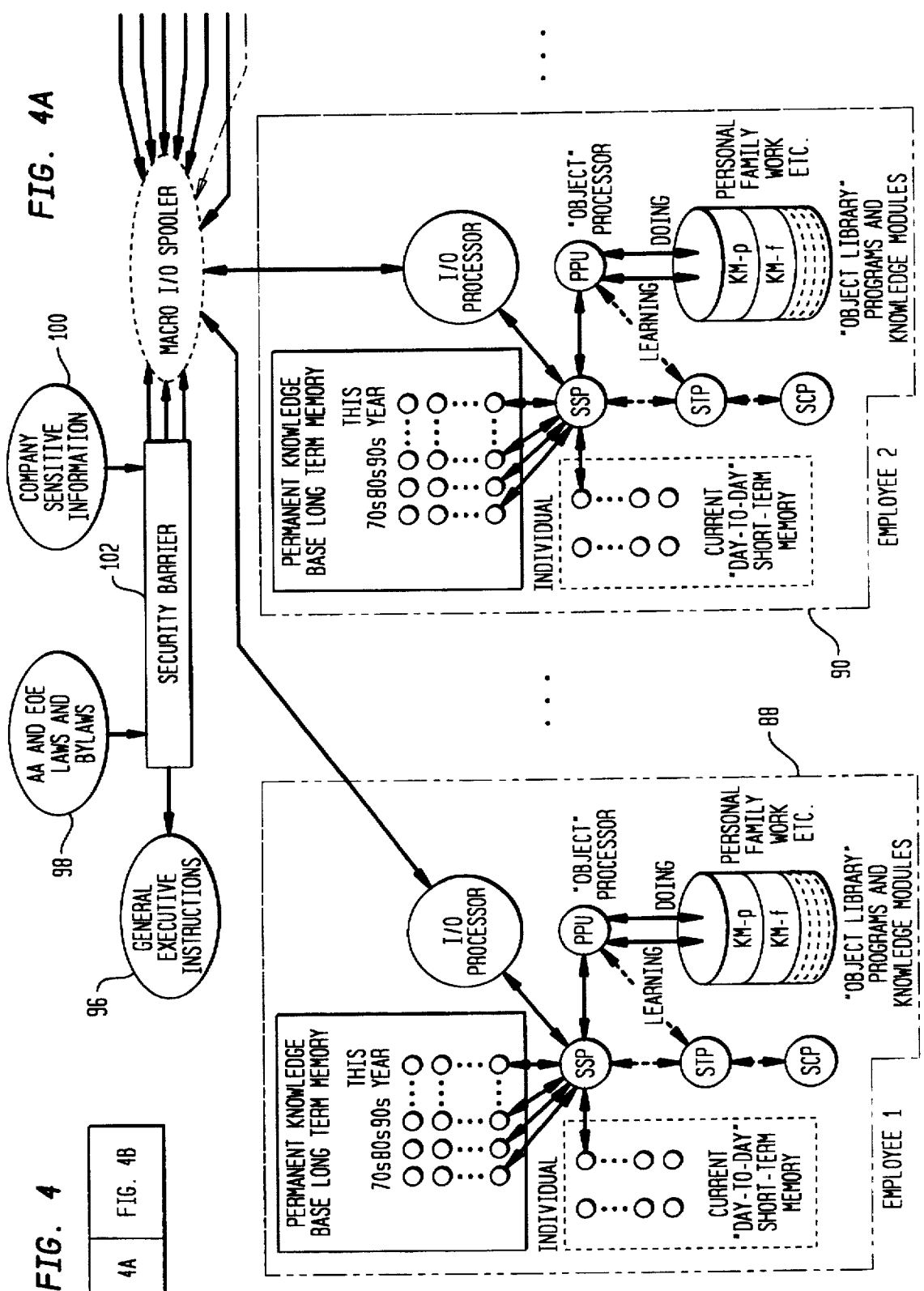

PERSONAL COMPUTER-BASED INTELLIGENT NETWORKS

BACKGROUND INFORMATION

1. Technical Field

This disclosure relates to information processing, and in particular to a personal computer-based intelligent network for providing personalized and intelligent information processing.

2. Description of the Related Art

Knowledge processing has been an integral part of knowledge engineering since the early 1980s. Concepts from knowledge engineering have matured into well accepted disciplines such as artificial intelligence, expert systems, pattern recognition, computer vision, robotics, etc. Such disciplines provide a framework for engineers to design and build automated computer-based response systems.

For example, expert systems provide a user with an opinion or approximation thereto of one or more experts in the field, based on stored expertise, as such experts may respond to the query of the user. Such expert opinions are generated generally from a knowledge base organized as an ultra-large and sophisticated data structure. Queries having sufficient details and precision allow an expert system to generate a response substantially similar or even identical to the response which the expert would have provided. General queries may receive broad and/or shallow information, and specific queries may receive precise information. Thus knowledge or information may be engineered to satisfy users in a variety of situations.

In another example, for computer vision applied to a medical environment, blood samples may be drawn from patients and scanned for certain types of cells with specific structure. Such scanning may be automated, for example, by presenting and/or digitizing a microscope image on a computer screen to generate pixels in which the cell boundaries form dark pixels. A computer may then see and/or detect such boundaries and also detect if such boundaries match the boundaries of specific cells which may be expected or not expected from specific types of patients. A computer may be trained to match patterns at an elementary level, and to see images as in computer vision at an advanced level.

Both pattern matching and computer vision may employ both mathematical and heuristic methods, since the match may be less than perfect and detected attributes may not be exactly what the computer was programmed to find. Degrees of uncertainty and lack of precision may accrue, so the application of probability and confidence levels has been developed in these disciplines.

Computer-generated results which verge on being valid, for example, about 90% or 95% of the time are generally better than having no results at all. In providing such knowledge processing, computers using knowledge processing techniques and associated knowledge functions, such as knowledge modules and subroutines, are finding greater acceptance in society, such as medical and business applications. Computer systems dedicated to performing well accepted functions routinely such as identifying the bar code in grocery stores or voices in voice activated systems are presently becoming common occurrences.

Heretofore, previous machines that performed these knowledge functions have been implemented with general purpose computer systems having intricate layers of software which permit the machine to accomplish knowledge processing. However, the implementation of such software has been complex and wrought with difficulties, for example, in maintenance of the software.

Network intelligence is generally used in providing services including the 700, 800, 900, 911, and ABS network services supported by the telecommunication networks. Private networks also provide specialized services, such as weather, sports, stock market, real estate, and financial information. The corresponding operating companies and the commercial organizations have used intelligent network components and their functions to varying degrees, but a more comprehensive use of the potential of Intelligent Networks (INs) has not reached individuals and organizations. In addition, the implementation of INs has generally been limited to more expensive computer systems such as mainframes.

While generic components of computing are available, such as processors, memory, switches, and input/output (I/O) units, heretofore, personal computers (PCs) have not been adapted to provide the functions of intelligent networks in a manner suited to the information needs of individuals and organizations for control, coordination, and communication of information and knowledge. Such adaptation of available and relatively inexpensive personal computers to INs would provide greater knowledge processing for individuals and organizations, and may be readily adaptable to perform interactive processing of knowledge.

SUMMARY

It is recognized herein that personalized implementations of processors and architectures of knowledge processing systems specifically dedicated to processing knowledge associated with a specific user directly from goals and objects, as well as their attributes, or other relevant information would improve information processing by processing intermediate objects, their attributes, or modules of information to reach a goal of an individual.

The compiler or processor of the disclosed knowledge processing machines processes input queries by attempting to identify intermediate objects from the past experience and the attributes of interacting objects. Such compilers may employ techniques such as forward, backward and indirect pointers to and from objects, and may associate objects from a history of associations. Although complex queries may require long and intricate knowledge processing techniques, which may result in levels of ambiguity or uncertainty in the processing, the disclosed knowledge processing machines employ learning and compromising methods during the solving of problems.

A knowledge processing system and method is disclosed for providing a personal computer-based intelligent network to incorporate personalized functions with knowledge domain functions and database management functions. The knowledge processing system includes: a memory for storing knowledge in a plurality of knowledge modules in a knowledge bank, in which the knowledge includes data associated with pre-existing solutions to previous problems; and a processing unit, operating knowledge-based software configured to represent a specific user, for generating a plurality of artificial intelligence based modules, and for executing the plurality of artificial intelligence base modules to process input data, including problem related data, for generating a solution-related module from the data representing the pre-existing solutions, with the solution-related module corresponding to a solution to the current problem.

In focusing upon basic human needs of individuals and organizations as the targets of achievement, an intelligent network functional approach improves the implementation of knowledge processing to such individuals and organizations. In the disclosed knowledge processing system and method, personalized intelligent networks (PINs) are implemented within, for example, a personal computer, and are customized and tailored to suit the personality of the user and to achieve personalized goals.

BRIEF DESCRIPTION OF THE DRAWINGS

The features of the disclosed knowledge processing system and method will become more readily apparent and may be better understood by referring to the following detailed description of illustrative embodiments of the present invention, taken in conjunction with the accompanying drawings, in which.

DESCRIPTION OF THE PREFERRED EMBODIMENTS

Figure 1:
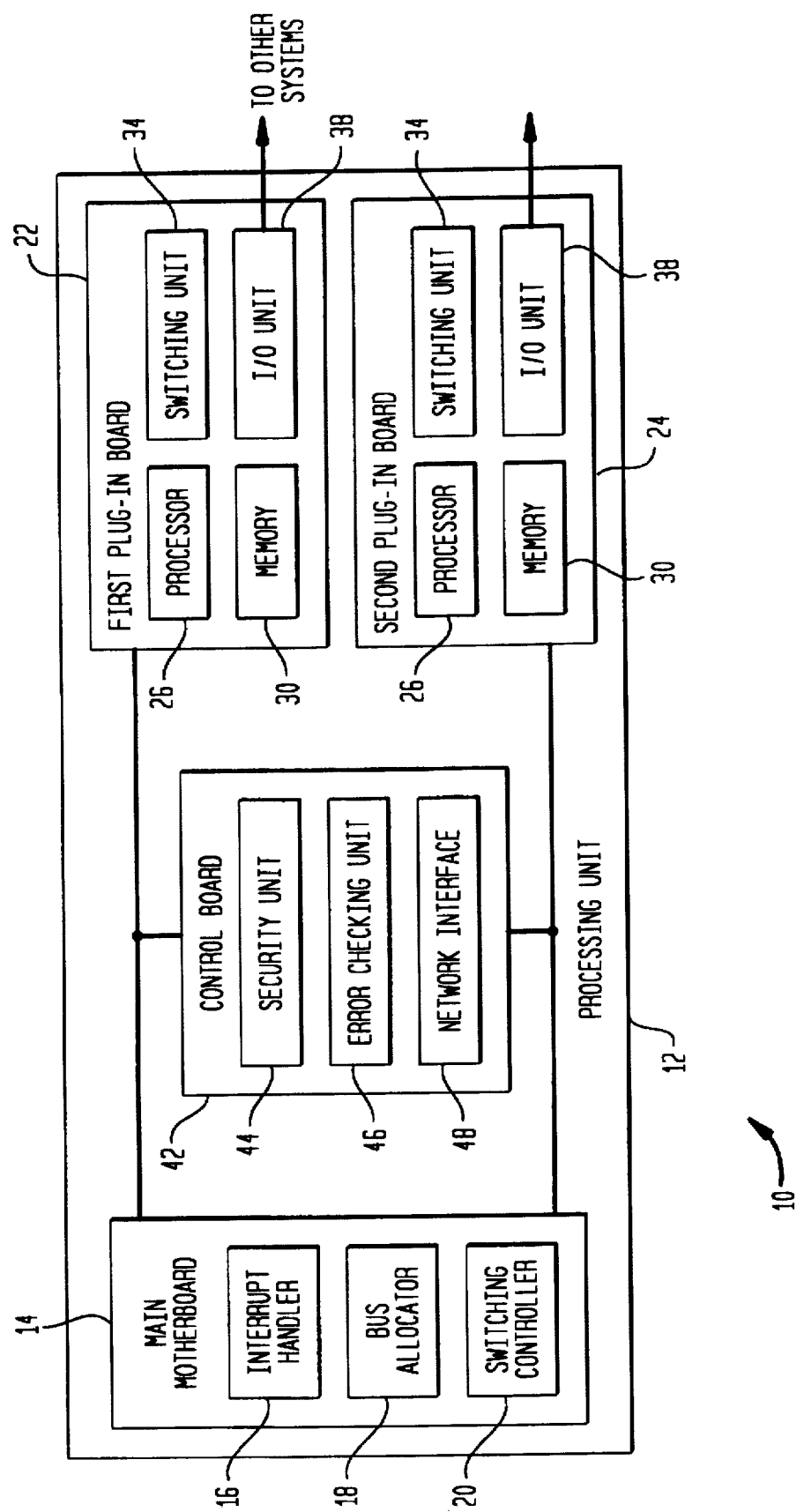
FIG. 1 is a block diagram of the disclosed knowledge processing system.

Referring now in specific detail to the drawings, with like reference numerals identifying similar or identical elements, as shown in FIG. 1, the present disclosure describes a knowledge processing system 10 and method for providing a personal computer-based intelligent network to incorporate personalized functions with knowledge domain functions and database management functions.

It is to be understood that references to a "user" with reference to a person, an individual entity, a personal computer, personalized intelligent networks, object, goals, agendas and plans, etc. are also applicable to groups of people, organizations, nations, societies, etc.

For clarity of explanation, the illustrative embodiments of the disclosed knowledge processing system and method are presented as having individual functional blocks, which may include functional blocks labelled as "processor" and "processing unit". The functions represented by these blocks may be provided through the use of either shared or dedicated hardware, including, but not limited to, hardware capable of executing software. For example, the functions of the processor and processing unit presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

The knowledge processing system 10 and method includes a processing unit 12 having a main motherboard 14 including an interrupt handler 16 for responding to and processing interrupts, a bus allocator 18 for controlling the flow of data and control signals on data buses, and a switching controller 20 for controlling the transfer and switching of such data and control signals. The processing unit 12 also includes at least one plug-in board 22, 24 operatively connected to the main motherboard 14, with each plug-in board 22, 24 having individual processors 26, 28; memory 30, 32; switching units 34, 36; and input/output (I/O) units 38, 40, respectively. Each plug-in board 22, 24 performs the functions of database management as a database management system (DBMS), of artificial intelligence (AI) techniques, and/or multimedia I/O functions using hardware, firmware, and/or software such as software modules.

The processing unit 12 may also include a centralized control board 42 having a security unit 44 to perform data encryption and decryption and other security functions; an error checking unit 46 for ensuring data integrity by performing error checking techniques known in the art on processed data; and a network interface 48 for operating known network protocols to connect the processing unit 12 to external devices in a network configuration.

In an illustrative embodiment, the processing unit 12 is a personal computer, and alternatively may be implemented using a workstation or a terminal operatively connected to a mainframe. For such implementations, the processing unit 12 may include a processor, memory, stored programs including an interactive computer program, an input device, and an output device (not shown in FIG. 1), with each of the components incorporated, for example, on the main motherboard 14.

In one embodiment, the processing unit is a SPARC workstation available from Sun Microsystems, Inc. having about 10 MB associated RAM memory and a hard or fixed drive as memory. The processing unit 12 operates using the UNIX operating system to run application software as the stored programs providing programs and subroutines implementing the knowledge processing system 10 and method.

The processing unit 12 receives commands and input data from an input device which includes a keyboard, a mouse, and/or a data reading device such as a disk drive for receiving the data in input data files from storage media such as a floppy disk or an 8 mm storage tape. The received data are stored in memory for further processing to generate knowledge-based outputs. In addition, through the input device, the user can select commands using the mouse.

The generated knowledge-based outputs are sent to the output device such as a display for display thereof. Alternatively, the output device may include specialized graphics programs to convert the generated data to a displayed graphics. In additional embodiments, the outputs may be listed in a file for output as columns or tables of text by the output device which may be a display or a hard copy printer.

The knowledge processing system performs knowledge processing application programs and subroutines which are implemented from compiled source code in the FORTRAN and/or the C programming languages. It is understood that one skilled in the art would be able to use other programming languages such as C++, as well as object oriented programming, to implement the knowledge processing system 10 and method.

Using adaptive and dynamic knowledge processing application programs and subroutines, the processing unit 12 may be customized for individual users to operate as a personalized intelligent network (PIN) to liberate the human mind to pursue truly creative functions. In this manner, the architecture of a typical personal computer is adapted to process, learn and remember, switch and access, and carry out routine input/output (I/O) functions for accomplishing AI-switching point/service transfer point-type processing/routing; compact disk read only memory (CD ROM) and disk-based DBMS (service control point) memory and lookup; time-division multiplexing (TDM) bus-control-based access (service switching point) type switching; and routine knowledge input/output functions.

The processing unit 12 is configured to implement an intelligent network, with service provisioning of special services operating in a cooperative arrangement of at least five interdependent components: service switching points (SSPs), service transfer points (STPs), service control points (SCPs), service creation environments (SCEs), and intelligent peripherals (IPs).

Using SSPs, the processing unit 12 is capable of recognizing service trigger conditions, such as 700, 800, and 911 numbers. For implementing a self-contained system using, for example, a personal computer, the processing unit 12 uses the SSPs for local switching within the PIN. A network-based system uses the SSP to initiate a query to and from outside databases.

The processing unit 12 uses STPs as relay points for accepting command information to and from SSPs and SCPs. STPs are important in the operation of a PIN in handling the access to a plurality of available knowledge bases and I/O interfaces. At STPs, translation of logical addresses occurs, and STPs provide local I/O interfaces of the physical address of the information sought from its local databases.

The processing unit 12 uses SCPs as extensive databases with information which is to be well managed, replaceable, and easy to update, so that queried information is readily available to an SSP as the SSP completes a service, or a service process, that it is performing at a particular instant of time and as the provisioning of the service progresses.

In the PIN environment, the storage of information which may be readily updated is important for providing a quick reference to the various categories of subjects and the type of derived information about these subjects. The databases in the SCP are equivalent to a knowledge profile of the information included in at least one knowledge module (KM) of the system 10, for providing the knowledge processing system 10 with the ability to steer any knowledge process through the vast maze of information included in the at least one knowledge module.

The processing unit 12 uses SCEs to provide service vendors with a programming and debugging environment to test new service concepts or ideas. In this environment, new services may be programmed as service-logic programs into the network by assembling a new service as a program of various well defined functional modules, which correspond to macros or routines in conventional computer environments.

The functional modules provide bridges for service providers to perform valid network subfunctions consistent with the service which the functional modules are providing. Such service-logic programs may be interpreted by a service-logic interpreter (SLI) which may be implemented or provided in an SSP, SCP, or IP to act in conjunction with a local network information database (NID), allowing a new software interface to be tailored for such local networks.

In the PIN environment of the processing unit 12, the SCE is activated as new inference engines become available from knowledge engineers. The data for deriving the new inferences may be resident in the KMs, and newer implications obtained from the new inference engine are then available to a user. By programming a new inference engine into the KM using the SCE, the processing unit 12 may generate new inductions from old knowledge and/or to generate new inferences from old data.

The processing unit 12 uses IPs as a network node with SS7 connectivity to an SSP, for example, via dedicated trunk lines or via ISDN lines for primary rate capability. The IP may be bridged to the communication channel for the duration of a programming call. As programmable elements, IPs may provide a great variety of services for the processing unit 12.

In the PIN environment of the processing unit 12, customized variations of the response from the PIN may be altered to become individual responses to a particular application of the user in view of previous experience about the particular application. For example, a pharmacist may use the processing unit 12 to determine the clinical properties of certain plants, and a botanist may use the processing unit 12 to determine habitat and climactic conditions. Accordingly, IPs are useful in providing the knowledge service to the user in a fashion, style, and format appropriately tailored to the needs of the user.

In the knowledge processing system 10, the IPs may be implemented in hardware and/or software such as software modules or ROM-resident microprograms which have been primed to direct the processing unit 12 to match its response to the needs of the user.

The processing unit 12 having a processor is used to implement a personal processor unit (PPU), which has operator-operand functions based on a knowledge base of the user and available in a database or knowledge bank for dealing with humanistic and human situations. In an illustrative embodiment, the PPU may be implemented in hardware and/or software in a manner as described in commonly assigned U.S. appln. Ser. No. 08/657,924 entitled KNOWLEDGE PROCESSING SYSTEM EMPLOYING CONFIDENCE LEVELS, filed May 31, 1996, which is incorporated herein by reference.

In implementing the PPU, the processing unit 12 employs both cache and main memory to process the knowledge needs of users; for example, the memory of the processing unit 12 stores executable programs for macro-procedures derived from standard and routine transactions of users in their private and personal lives; for example, the various financial, taxes, medical, educational, checking, social, and relative-based transactions may be programmed in a manner known in the art. Such knowledge processing may be performed in a manner as described in commonly assigned U.S. Pat. No. 5,465,319, issued Nov. 7, 1995, which is incorporated herein by reference.

The personal knowledge of the user is programmed based upon the content-oriented (object) knowledge bases. Sets of macro-assembly level instructions may be implemented to provide the needs of particular users, their country, state, and so forth, consistent with their own practices. Such adaptation of human activities to computer-based operation is routinely performed; for example, in installing user preferences to most operating systems, such as MICROSOFT WINDOWS. Accordingly, the knowledge bank of the processing unit 12 may include a plurality of user-specific and/or user-specified preferences and data.

In the illustrative embodiment, the processing unit 12, implementing a PPU, generates a sequence of AI modules and/or functions to solve a current problem or situation in view of the past history of solutions to similar or identical problems. Unique situations are alerted to the user and the uniqueness is identified.

The processing unit 12 then executes the sequence of the AI functions to yield an actual solution to the current problem, as described below. The processing unit 12 may also be optimized to perform a first high-level compilation of the AI functions to generate AI-oriented modules or subroutines, and then to execute the subroutines. The modules may be generated as objects for object oriented programming and processing.

The processing unit 12 implementing the PPU includes primary and secondary memories as the control and cache memories, respectively. Control memories are used to personalize the processing unit 12 to a user class; for example, classes such as accountants, analysts, bankers, bakers, etc., by profession, expertise, or use. The primary and secondary memories are used for executing the AI functions and for storing the knowledge bases.

The switching of data occurs between the PPU, memory, and I/O devices within the processing unit 12 implementing a PIN. I/O devices may also include network interfaces, cellular transmitters and receivers, graphics devices, video devices, CD-ROM drives, disk drives, intercom systems, appliances, alarms, and security devices, which may interface to the PIN. At least one device controller may be used for efficient interfacing and automatic response of all participating home appliances, devices, information centers, and data and knowledge banks.

The processing unit 12 is adapted to implement the PIN with a perspective of the user as providing a large, flexible, and adaptive knowledge base with a look-up table of contents. The processing unit 12 uses STPs to perform as a quick reference look-up table to associate the contents of the SCE or the knowledge base by user-defined keywords, such as years, yearly events, objects, houses, swimming pools, friends, telephone numbers, project numbers, and so on.

In one embodiment, a first plug-in board 22 implements such an STP for a single user PIN to hold the personal knowledge base of the user, and the SCP provides the data appropriate to a problem that is currently being solved, so that the SCP operates as a database of the processing unit 12.

In another embodiment, for groups of users, the user data may exist in separate, large, categorized knowledge bases, in which an SCP acts as the address provider for a particular user, depending on the objects or goals embedded in the problem being solved.

For rule-based functions of the mind as elaborate, programmable, and predictable processes, AI techniques are applied by the processing unit 12, such as neural network processing, to determine a prediction based on previous data. The processing unit 12, using object-oriented programming, operates as a PPU of the PIN to match the objects or goals of a current problem which the PIN is solving with what the processing unit 12 already "knows" about the objects of the particular problem, or similar problems, or any other related information to solve the current problem.

For processing social relations and the interactions of large numbers of changing and varied groups of people, organizations, networks, and/or machines, the processing unit 12 is adapted to communicate with a large number of identifiable relevant files, people, machines, or objects; i.e. goals. The processing unit 12 then creates appropriate interfaces using administrative, communication, and switching modules of an SSP. Implemented in processing unit 12 such as a personal computer, a PIN may thus become an extension of the rational part of the user's mind.

The processing unit 12 simulates the impact of the needs of a user. For example, using an input system and sensors, the processing unit 12 implementing a PIN may react to a need as the need is felt. In addition, the I/O system of the PIN simulates the basic sensor-motor reaction of the user, in which reactions such as one-step processes as well as complex processes and chain reactions in sensor-motor reactions are performed by the PPU performing PPU functions using the object oriented program libraries.

Accordingly, in the processing unit 12, the reaction, response, and disposition of sensory information is performed by AI-based programs executed in appropriate situations. In addition, the association, memory, and look-up functions are performed by a database manager of a SCP or by a manager of short-term and long-term memories supporting the PPU via the switching system.

The processing unit 12 monitors the extent of satisfaction of a need by evaluating a generated reaction with reference to sensor inputs which generated the reaction from the processing unit 12, and success or satisfaction is gauged by changes in the sensory information indicating reduction or extinction of the need.

If the reaction generated by the processing unit 12 is less than satisfactory, then the PPU of the processing unit 12 selects another more suitable response program. The functioning of the PIN is a self-learning process and operates as an intelligent and adaptive system. The processing unit 12 is then viewed as struggling to be optimal in its responses to needs.

In operating a PIN, the processing unit 12 streamlines human-machine transactions to achieve goals with optimally the least effort. The processing unit 12 also prepares for human-human transactions by performing an adequate search of relevant information, past experiences, related cases, and factors involved in the outcome of such transactions. In such preparation, the use of AI techniques by the processing unit 12 facilitate the PIN to act as a human support system.

In the processing unit 12, the "self" of the user is represented by a knowledge base storing the long-term memories, values, norms, and other learning associated with the user. The memory stores both long-term and short-term memory. Cache and main memory as well as disk drives, CD ROMs, and other storage devices are accessible to the PPU.

By learning, the PIN determines actions and responses from changes and/or interruptions in its activities by the sensors on the network, and the PIN stores the learned routines in an appropriate KM. Conversely, the PIN recovers and executes specific programs to dispose of routine interrupts from its sensors.

Figure 2:
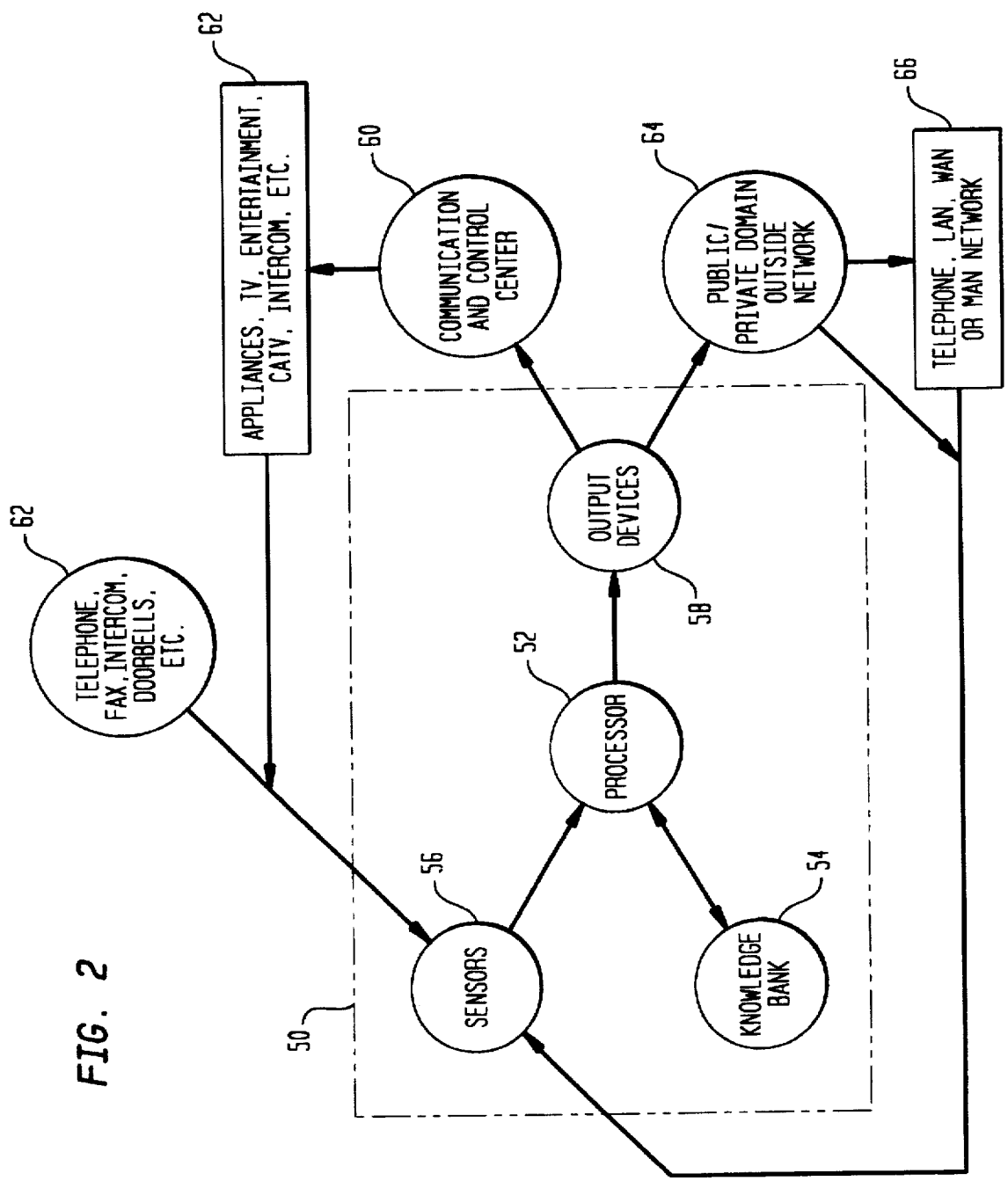
FIG. 2 is a block diagram of a personalized intelligent network (PIN)

As shown in an illustrative embodiment in FIG. 2, the knowledge processing system 10 includes a PIN 50 which is implemented in hardware and/or software by at least one processing unit 12 of FIG. 1. The PIN 50 includes knowledge-based memories, AI-based processors, customized local access special services (CLASS) based dispersed networks, and stimulus-response based I/O devices.

The processing 52, knowledge bank 54, sensors 56, output devices 58 of FIG. 2 correspond to the processor, memory, and input and output devices which may be embodied as described above with reference to the processing unit 12. In particular, the processor 52 may be a object oriented processor capable of processing objects programmed in objected oriented programming languages using, for example, Object Linking and Embedding (OLE) protocols.

The sensors 56 and other input devices provide input data signals to the processor 52 to be processed by the PPU of the processing unit 12 using stored experience/knowledge available in the knowledge bank 54. The processor 52 then generates output signals for use and/or output by the output devices 58. For example, data may be output as audio or video messages to the user, as data to other computer systems, or as control signals to allow the PIN 50 to gain control of external devices through the external command and control center 60.

In one embodiment, the command and control center 60 may be a centralized unit operatively connected to other devices 62 such as appliances, telephone answering machines, telephone call initiators, doorbells, thermostats, televisions, intercom systems, cable television units, other personal computers, other entertainment systems, etc. within a house or connected through other networks 64 such as private or public domain networks which may include and/or be connected to other external systems 66 such as telephone systems, local area networks (LANs), wide area networks (WANs), medium area networks (MANs), etc.

The devices 62, networks 64, and external systems 66 may also be connected back to the sensors 56 for providing interactivity with the PIN 50 to complete the social and data interactions of the PIN 50 with other users, computer systems and networks, robots, other PINs, etc. The response of the PIN 50 to external data may be a one step process or may be more complex, since the PPU 50 monitors the data and responds to data as appropriate by generating an intelligent set of macros to perform a specific function. For example, upon receiving a temperature reading through the sensors 56, the PIN 50 may respond by generating a control signal or robotic software macro for output through an output device 58 and the communication and control center 60 to a thermostat included in devices 62 to adaptively and intelligently control the thermostat. Feedback is established through sensors 56, and the PIN 50 may thus learn how to adjust a thermostat to an optimal, predetermined, or preferred temperature. The monitoring of recent and current tasks and activities is retained in short-term memory in the knowledge banks 54 of the PIN 50. After learning a task to generate task-oriented software modules, such as adjusting a thermostat, the software modules may be stored in long-term memory of the knowledge bank 54 as a learned task.

For the knowledge processing system 10 implementing PIN 50 in a personal computer of a single user, the knowledge bank 54 may be embodied as a disk-oriented SCP, with user information stored therein and accessible by a database manager. The PPU may seek and access data germane to the goals or objects to solve a current problem, for example, using techniques such as forward, backward and indirect pointers to and from objects, and may associate objects from a history of associations. The knowledge processing system 10 may use a hard drive in conjunction with other data storage techniques such as compression and multiple storage media such as floppy disks and tape drives to store the knowledge banks 54.

Figure 3:
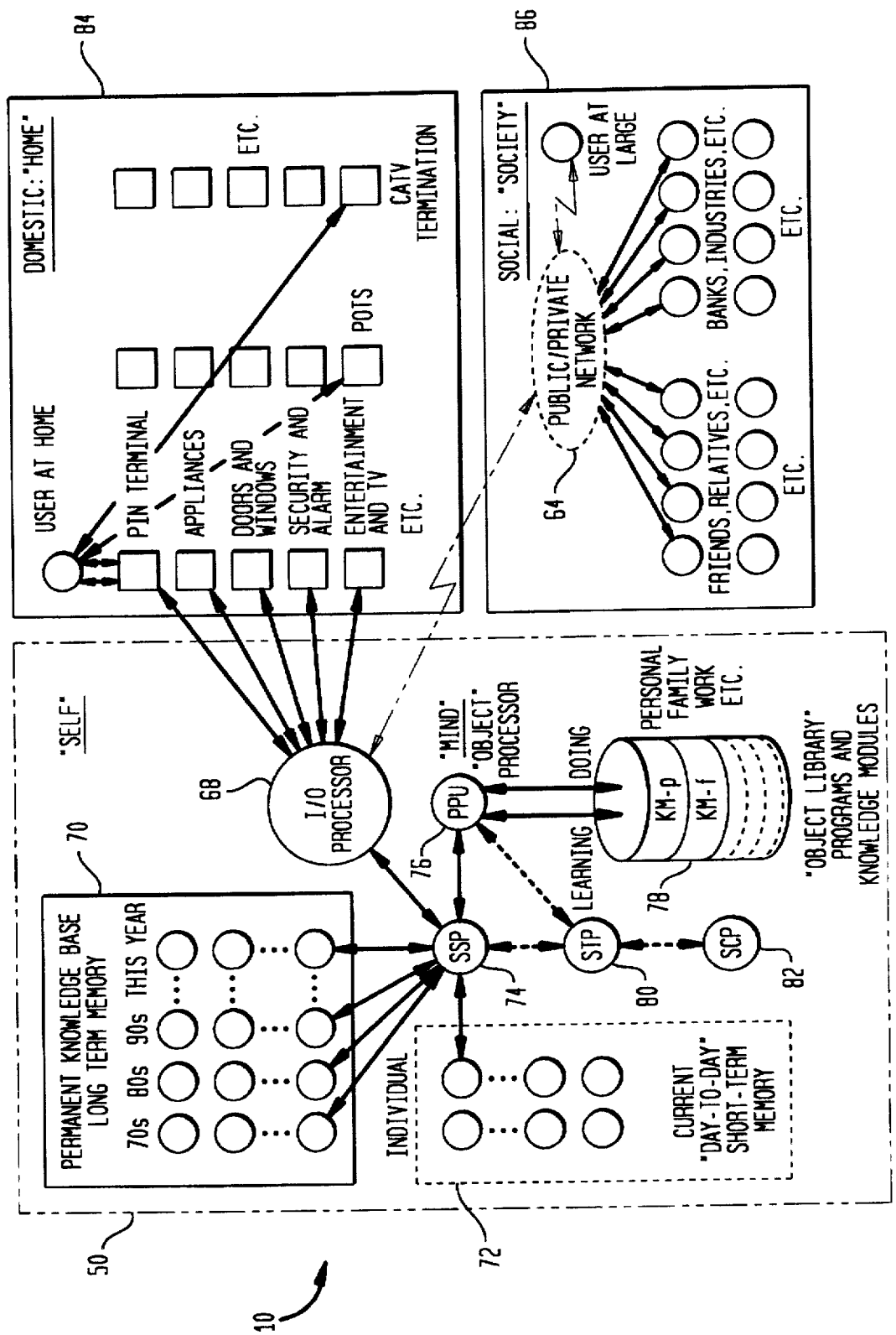
FIG. 3 is a block diagram of the PIN of FIG. 2 with greater detail.

In an illustrative embodiment for a PC-based knowledge processing system 10, the PIN 50 in FIG. 2 is shown in greater detail in FIG. 3, in which the processor 52 may be a centralized I/O processor 68 or a device handler which is operatively connected to other devices by buses, dedicated lines, wireless connections, etc. The operating program of the PIN 50 operates as a scanning system for scanning and polling devices for activities requiring responses, and/or the operating program may be interrupt-driven. Complex functions of a human being as the user or "self" may be accomplished as well as mundane and robotic duties.

The knowledge bank 54 includes a permanent knowledge base 70 for long term memory as well as a current "day-to-day" memory 72 or cache memory for short term memory such as daily activities of an individual; i.e. the user. The permanent knowledge base 70 and the current memory 72 operate through an SSP 74 to transfer and swap information between memory and I/O devices. Upon receiving a data request or knowledge request, the SSP 74 searches the memory for the appropriate data.

A PPU 76 is operatively connected to the SSP 74 as well as distinct knowledge modules 78 and/or programs, which may also be included in the knowledge banks 54, for storing a goal or object library for learning new tasks and doing pre-programmed or learned tasks based on the goal library. The PPU 76 is also operatively connected to an STP 80, and the STP 80 operates with the SSP 74 and an SCP 82, as needed. The I/O processor 68, the SSP 74, the PPU 76, the STP 80, and the SCP 82 may be incorporated at least in part in the processor 52 of FIG. 2 as hardware and/or software. The SCP 82 performs direct addressing of knowledge in the databases as, for example, a table of contents to facilitate storage and retrieval as the memory is scanned. If data is not stored in the local PIN 50, the STP 80 tracks the location in the PIN 50 in which such data is stored, and so acts as an extended table of contents in relation to the SCP 82.

The PIN 50 is operatively connected through the I/O processor 68 to other systems 84, 86. Home or domestic based systems 84 may include the communication and control center 60 and devices 62 of FIG. 2, such as users, a home, PIN terminals, appliance, doors and windows, security and alarm systems, entertainment and TV systems, etc., as well as connections or ports to "plain old" (i.e. basic) telephone service (POTS), CATV terminations to cable companies, etc.

The devices at home 84 may have a dedicated network with access to the PPU 76 of the PIN 50 via a single port. The message handling in the PPU 76 may be streamlined to handle predetermined emergency situations quickly without referencing knowledge bases to automate reflex actions as in reflexes of the central nervous system in humans.

The PIN 50 is also connected to society or social-based systems 86 through public/private networks 64 to the user at large, to other individuals such as friends, relatives, etc., and to other institutions or organizations such as banks, industries, etc.

The PIN 50 shown in FIG. 3 thus integrates the knowledge domain of an individual with facilities at home, outside the home, and society at large. The user remains free to handle and control his/her activities, and allows the knowledge processing system 10, using the PIN 50, to process and handle programmable and routine functions.

As the switching of data and command signals and I/O processing may the most frequent functions in the PIN 50, the knowledge processing system 10 has the main motherboard 14 include and operate the interrupt handler 16, the bus allocator 18, and the switching controller 20 using bus switching and device control software modules as well as the I/O processor 68.

The PPU 76, which may include cache memory and short-term memory 72, may be included in a first plug-in board 22, and disk controllers and the long-term memory 60 may be included in additional plug-in boards 24.

The long term memory 70 and short term memory 72 may be SCPs, including track/sector or physical addresses of the stored knowledge, which may also be included in the SCP 82. Appropriate addresses of data may be forwarded to the SSP 74 to access the relevant information required to execute a particular KM-based module 78 by the PPU 76.

In alternative embodiments, more complex PINs may be implemented; for example, on a time-shared basis for all members of a family, or for small companies. Network-based PINs may also serve as management information system (MIS) networks for midsized companies.

A network of a plurality of PCs may also implement a PIN. Physical separation of the PCs may enhance the security of information and the KMs of individual users at home or in a small company. Such a networked configuration allows individual members of the house or the group to continue to use their own PC in a traditional manner, as well as to communicate with and access society as well as long-term memories such as encyclopedias, maps, charts, and shopping and billing contacts for the family by using the networked PIN.

Figure 4B:
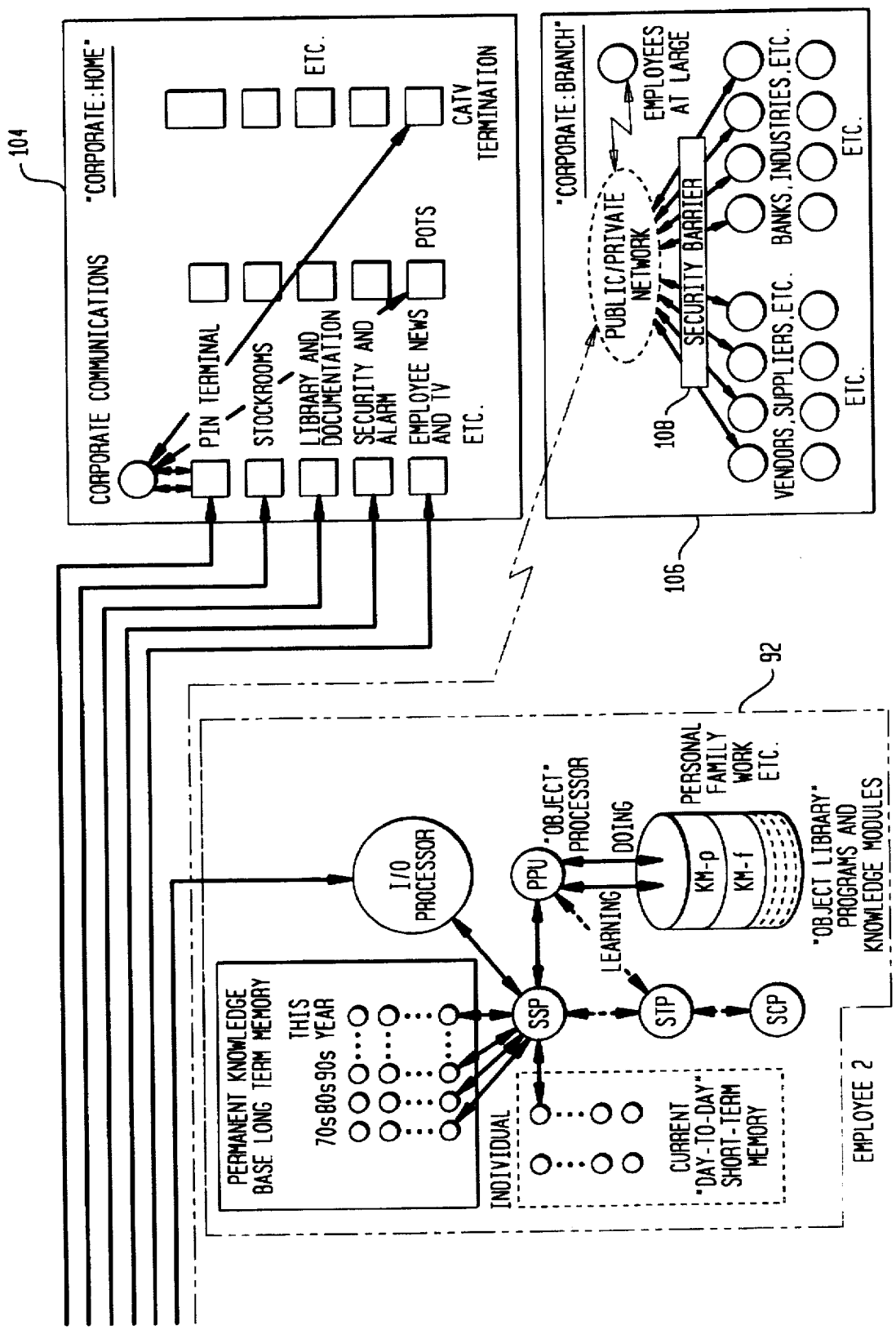
FIG. 4 is an alternative embodiment of a PIN networked for an organization.

In an alternative embodiment shown in FIG. 4, PINs 88, 90, 92 serving an organization may be networked, with one PIN operating as a macroscopic I/O spooler for interfacing the PINs 88, 90, 92 to organizational knowledge banks 96, 98, 100 including, for example, general executive instructions, affirmative action (AA) and equal opportunity employment (EOE) laws and bylaws, and company sensitive information. Such knowledge banks 98, 98, 100 may be protected from unauthorized access by a security barrier 102; i.e. a security system or protocol known in the art.

The PIN 94 may be implemented, for example, in a corporation to interface with a corporate home or central office 104 including corporate communications devices, PIN terminals, stockrooms, corporate libraries and documentation, corporate security and alarm systems, employee information sources such as corporate news and TV, etc., as well as corporate telephone systems and CATV terminations for corporate cable systems.

The PIN 94 may also interface with corporate branches 106 through public and private networks to employees at large as well as vendors, suppliers, banks, industries, etc. Additional security barriers 108 may also be used.

Using the networked PIN configuration in FIG. 4, the various PPUs of the PINs 88-94 operate as a corporate entity for knowledge processing personalized; i.e. customized, to the corporation.

In alternative embodiments, PINs may be used, for example, by handicapped users to enhance their participation at home or in society by adapting their own devices to communicate with file servers or I/O spoolers to I/O rings of other systems. Accordingly, such users may perform regular functions while in or out of an office. In another example, traveling salespeople may perform remote ordering via I/O rings and spoolers of corporate PINs.

In operation, the knowledge processing system 10 operates the PPUs of the PINs to combine personal functions with functions from the knowledge domain and database management. In the illustration of the operation of the knowledge processing system 10, reference is made, for example, to the PIN 50 in FIG. 3.

Figure 5:
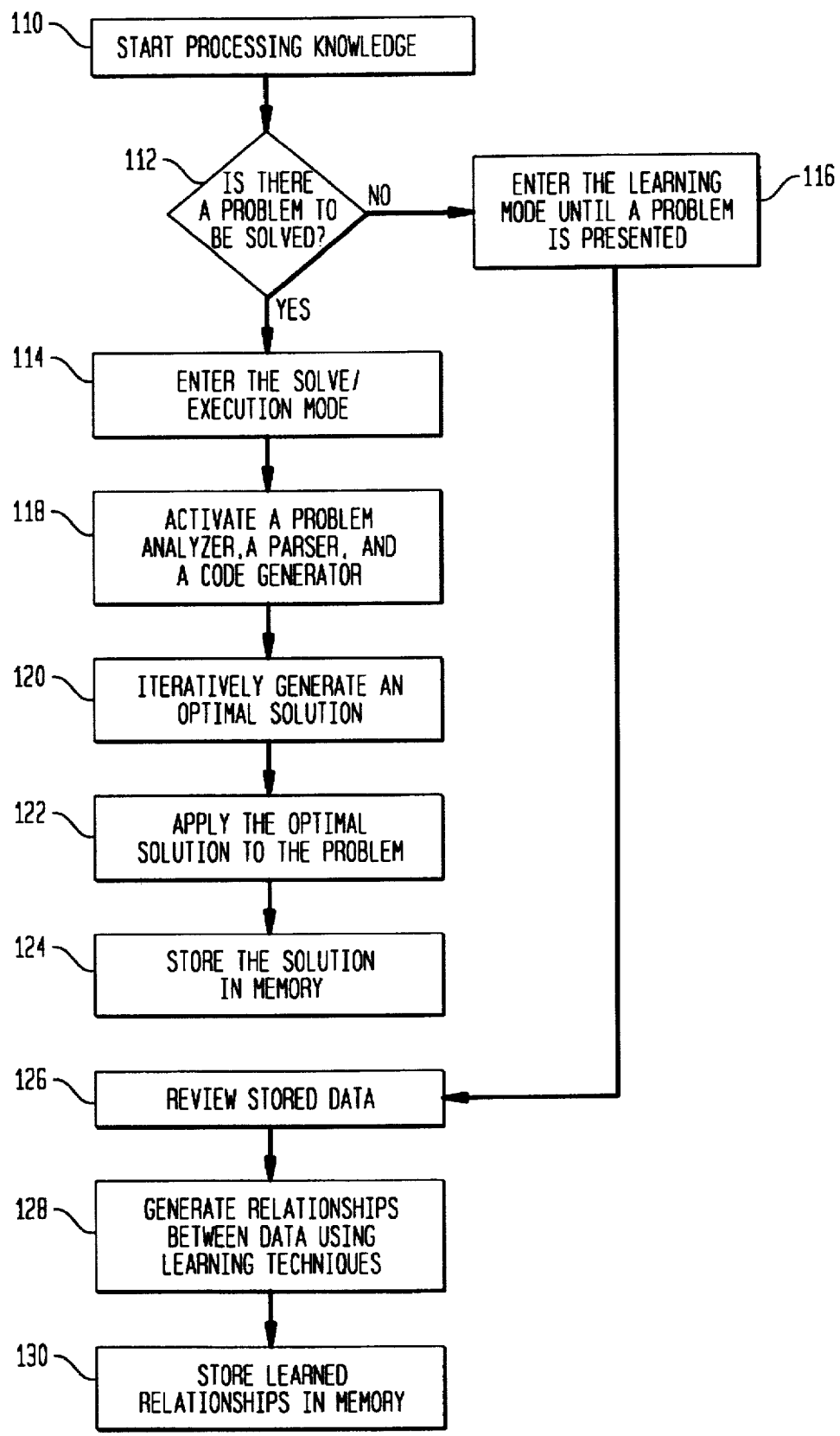
FIG. 5 is a flowchart illustrating the operation of the disclosed knowledge processing system.

As shown in FIG. 5, the PPU 76 starts processing knowledge in step 110, and determines in step 112 if there is a problem to be solved; for example, if a query is presented from the user. If there is a problem to be solved, the PPU 76 enters a solve/execution mode in step 114; otherwise, the PPU enters a learning mode in step 116.

The solve/execution mode is performed in step 114 when the PPU 76 is engaged in actively solving any problem by using a series of steps that have been used in the past to solve similar problems. In this mode, the PPU 76 processes knowledge to derive new modules of inference to proceed logically to its next step. For example, the solve/execution mode is entered by the PPU 76 to actively preparing a tax return for any given year by using a generic tax program stored in the KMs 78.

As shown in FIG. 5, in the solve/execution mode, the PPU 76 activates in step 118 a problem analyzer, a parser, and a code generator which may be embodied as software modules in the PPU 76. The problem analyzer detects the nature, scope, and context of the problem, and the parser detects goals, objects, humans, or events involved in the problem.

After the problem analyzer and parser perform such functions, the PPU 76 searches a strategy database in the long term memory 70 for the objects, people, or events that participate in the problem, and the results of the search of the strategy database provide intermediate information used by the PPU 76 to generate a solution strategy or a game plan for solving the problem using code generated by a code generator. The code generator determines macro steps which may be performed to attempt a solution, determines if any information is missing, finds subgoals embedded in the solution, and generates a solution diagram similar to a game plan or the critical path method in a final solution.

The generation of such solution-code for a final solution is iteratively performed in step 120 to modify the code to generate an optimal code for solving the problem. In such iterative processing, the code generator searches local, network-based, corporate, or global knowledge banks. Satisfactory strategies of the past, such as steps previously taken and stored as macros in the strategy database, may be invoked more frequently upon goals involving the same or similar groups. Objects, humans, or events and particular rules associated therewith may thus be provided high contextual significance in the problem analysis and the synthesis of code by the code generator.

Upon generating the optimal solution-code, the PPU 76 applies the optimal solution-code to the problem in step 122 to solve the problem and to generate corresponding outputs to the user as the solution of the problem. The solution-code may then be stored in long term memory 70 in step 124.

In the learning mode, the PPU examines past experience by reviewing stored data in step 126 to search an observation database in the long term memory 70. The observation database may be a network or library of objects or goals and their attributes, humans and their traits, and events and their circumstances. Individualized needs, rules, behaviors, and mannerisms may also be accumulated in the observation database. The observation database may be organized as an object-base, people-base, or event-base.

Past experiences and new knowledge are tagged and stored for future use in the appropriate databases. A summary or "snap shot" of this detailed learned information may also stored for quick response in the short-term memory 72. For example, learned thermostat control routines may be stored in the short-term memory as modules which may be daily or regularly performed to adjust room temperatures.

In learning mode, the PPU 76 actively studies and reviews previous actions of the user or of the PIN to generate and/or extract rationality, relationships, rules, and strategy in step 128. Such learning may be performed by learning techniques, pattern recognition systems, and computer vision methods, using; for example, neural networks and fuzzy logic.

The PPU 76 may learn series of steps from a study of previous actions taken by the user in solving the same or similar problems. Code corresponding to learned relationships, successful solutions as well as tentative solution-code for new problems may be stored in step 130 in the long term memory 70 for access by the PPU 76 upon presentation of the same or similar problem.

By using PINs of the knowledge processing system 10, a user may allow the PINs to non-invasively handle mundane functions of daily lives based on preprogrammed AI modules. The operation of the PIN to supplement the user's knowledge and activities may automatic, or may be subject to approval by the user. By blending a complex set of human functions with routine functions of a PIN, the PIN relieves the mind of the user to perform complex functions more precisely, effectively, and optimally, thus improving the quality of life. In personal computer-based implementations, the basic functions of processing, data retrieval, switching and I/O processing are recast to do the functions of living beings and so are not limited to computing or communicating.

Since PINs are adaptable, programmable, able to solve problems, and able to learn additional knowledge, computers using PINs may be personalized, for example, for children, for handicapped persons, and for professionals. Private PINs, home PINs, and company PINs may also be implemented with a single PC or a ring or other configuration of PCs in a network.

While the disclosed knowledge processing system and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A knowledge processing system comprising:
   a memory for storing knowledge in a plurality of knowledge modules in a knowledge bank, the knowledge including data associated with pre-existing solutions to previous problems and a knowledge base of a specific user including long-term and short-term memories; and
   a processing unit, operating knowledge-based software configured to represent the specific user and to manage and integrate the knowledge base of the user through links in a computer network, for generating a plurality of artificial intelligence based modules, and for executing the plurality of artificial intelligence base modules to process input data, including problem related data corresponding to a current problem, said processing unit further operable to generate a solution-related module from the data representing the pre-existing solutions in conjunction with the knowledge base of the user, wherein the solution-related module corresponds to a solution to the current problem.

2. The knowledge processing system of claim 1 wherein the processing unit further includes:
   a motherboard for data switching and control of data between the memory and the processing unit; and
   at least one plug-in board, operatively connected to the motherboard and including an artificial intelligence processor, for operating the knowledge-based software, for generating a plurality of artificial intelligence based modules, and for executing the plurality of artificial intelligence base modules to process the input data for generating a solution-related module from the data representing the pre-existing solutions.

3. The knowledge processing system of claim 2 wherein the motherboard and the at least one plug-in board are configured in a personal computer.

4. The knowledge processing system of claim 1 wherein the processing unit includes:
   a plurality of modules operating as an intelligent network for generating the plurality of artificial intelligence based modules, and for executing the plurality of artificial intelligence base modules to process the input data, the plurality of modules including a service switching point (SSP) module, a signal transfer point (STP) module, and a service control point (SCP) module.

5. The knowledge processing system of claim 4 wherein the processing unit includes a personal processor unit, operatively connected to the SSP module, for accessing the plurality of knowledge modules to generate the solution-related module.

6. The knowledge processing system of claim 4 wherein the processing unit includes an input/output (I/O) processor, operatively connected to the SSP module to external sources of input data, for receiving the input data and for transferring the input data to the SSP module.

7. The knowledge processing system of claim 1 wherein the processing unit, using the knowledge-based software, operates in a solution mode to iteratively process the input data using the plurality of artificial intelligence modules to generate data corresponding to an optimal solution to the current problem.

8. The knowledge processing system of claim 1 wherein the processing unit, using the knowledge-based software, operates in a learning mode to access and process the knowledge in the plurality of knowledge modules stored in the memory and to apply the plurality of artificial intelligence modules to generate relationships from the stored knowledge.

9. The knowledge processing system of claim 8 wherein the processing unit includes a neural network for generating the relationships from the stored knowledge.

10. A personalized intelligent network comprising:
    a memory for storing knowledge in a plurality of knowledge modules in a knowledge bank, the knowledge including data associated with pre-existing solutions to previous problems and a knowledge base of a specific user including long-term and short-term memories;
    an input device for receiving input data, including problem-related data representing a current problem; and
    a processing unit, operating knowledge-based software configured to represent the specific user and to manage and integrate the knowledge base of the user through links in the network, for generating a plurality of artificial intelligence based modules, and for executing the plurality of artificial intelligence base modules to process the input data, including problem related data, for generating a solution-related module from the data representing the pre-existing solutions in conjunction with the knowledge base of the user, with the solution-related module corresponding to a solution to the current problem, the processing unit including:
    a plurality of modules operating as an intelligent network for generating the plurality of artificial intelligence based modules, and for executing the plurality of artificial intelligence base modules to process the input data, the plurality of modules including a service switching point (SSP) module, a signal transfer point (STP) module, and a service control point (SCP) module.

11. The personalized intelligent network of claim 10 wherein the memory and the processing unit are configured in a personal computer.

* * * * *